United States Patent [19]

Rich et al.

[11] Patent Number: 4,881,578
[45] Date of Patent: Nov. 21, 1989

[54] COMBINATION FILLER PIPE AND VAPOR CONTROL MEANS

[75] Inventors: Gregory E. Rich, Richmond; Roy A. Giacomazzi, Rochester Hills; Jack C. Wilds, Mount Clemens, all of Mich.

[73] Assignee: General Motors Corporation, Detroit, Mich.

[21] Appl. No.: 265,971

[22] Filed: Nov. 2, 1988

[51] Int. Cl.[4] .................. B65B 31/00; F16K 24/00
[52] U.S. Cl. ................................. 141/44; 137/588; 220/85 UR; 220/86 R; 220/DIG. 33; 141/46; 141/59; 141/301
[58] Field of Search ........... 220/85 UR, 85 US, 86 R, 220/85 R, DIG. 33; 141/51, 52, 59, 44-46, 301-305, 307, 308, 285, 286, 289-292, 295, 346, 349, 325, 326; 137/587, 588; 123/516, 518, 519; 55/182, 387; 280/830, 834-839

[56] References Cited

U.S. PATENT DOCUMENTS

| | | | |
|---|---|---|---|
| 3,133,564 | 5/1964 | Hunter | 141/286 |
| 3,171,448 | 3/1965 | Fromm | 141/346 |
| 4,630,749 | 12/1986 | Armstrong et al. | 220/86 R |
| 4,701,198 | 10/1987 | Uranishi et al. | 55/387 |
| 4,714,172 | 12/1987 | Morris | 220/86 R |
| 4,816,045 | 3/1989 | Szlaga et al. | 220/85 UR |

OTHER PUBLICATIONS

SAE Technical Paper Series, 861551, "Vehicle Onboard Control of Refueling Emissions—Systems Demonstration on a 1985 Vehicle", W. J. Koehl et al., Mobile Research & Development, (date unknown).

Primary Examiner—Ernest G. Cusick
Assistant Examiner—J. Casimer Jacyna
Attorney, Agent, or Firm—Patrick M. Griffin

[57] ABSTRACT

A combined filler neck and vapor vent line valve is provided by inner and outer pipes that are maintained in concentric relation by a sleeve tightly inserted between the outer pipe and an out-turned flange at the end of the inner pipe. This provides a convenient path out of the fuel tank for displaced tank vapors. Vapor control is provided by a stepped cylindrical valve body that rides up and down within the upper end of the inner pipe and the sleeve so that a seal on the outside of the valve body can cover and uncover openings in the flange to block and un-block a vapor path to the canister.

2 Claims, 4 Drawing Sheets

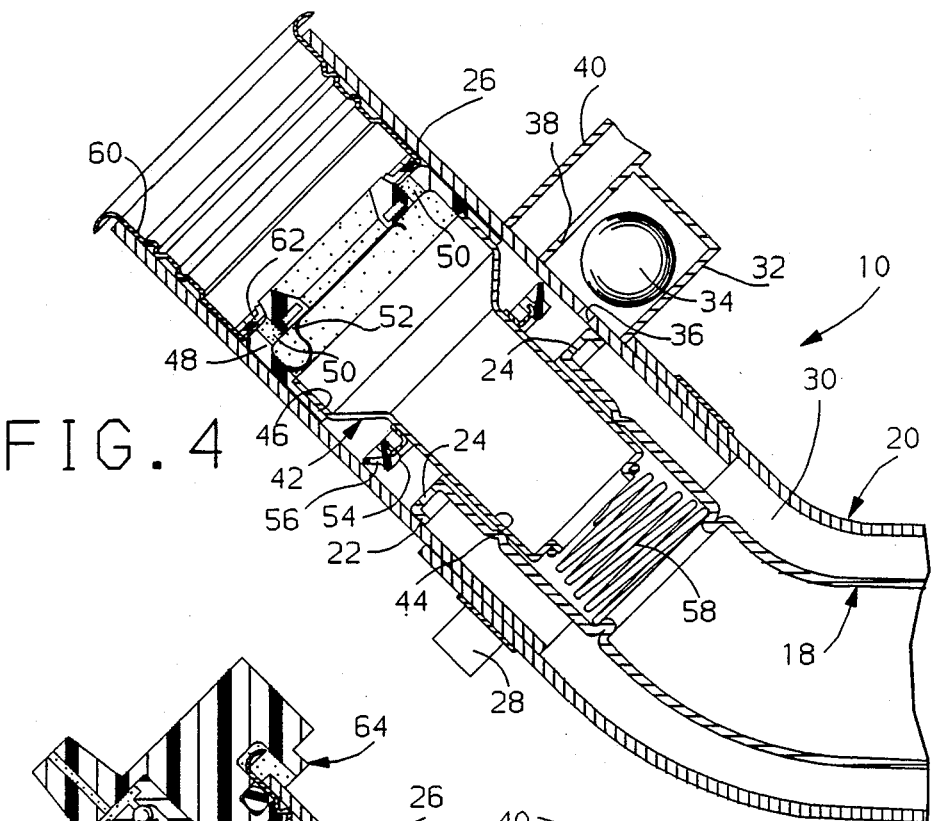
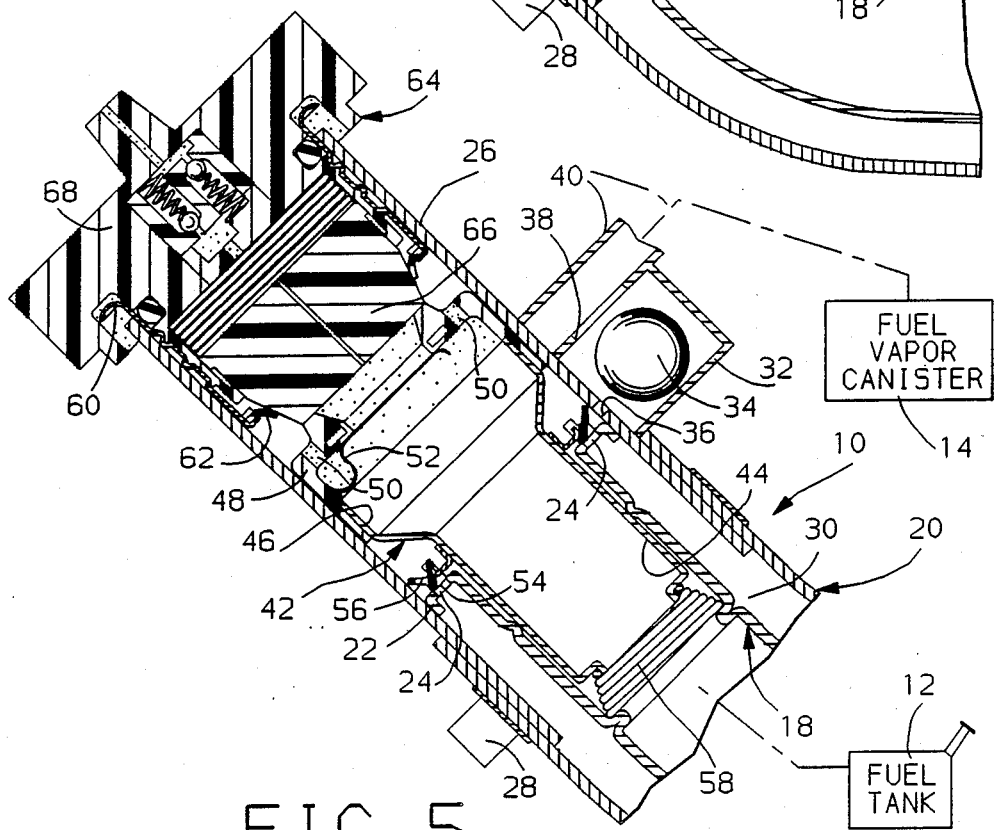

COMBINATION FILLER PIPE AND VAPOR CONTROL MEANS

BACKGROUND OF THE INVENTION

1. Field of the Invention

This invention relates to vehicle fuel vapor loss control systems in general, and specifically to such a system of the type that uses a liquid seal as the primary means to prevent the escape of fuel vapors up the filler pipe to atmosphere.

2. Description of the Related Art

Production vehicle fuel vapor loss control systems have for some time included a vapor storage canister and the associated vapor lines from the fuel tank to the canister necessary to control the vapors that form in the tank as it sits, typically referred to as the diurnal losses. Before that, diurnal losses were generally vented to atmosphere. Other significant sources of vapor loss to atmosphere are the fuel vapors displaced from the tank as it is filled, referred to as fuel fill vapors, and the pressurized vapors that form in the filler pipe when it is closed and which are released as the cap is removed, referred to descriptively as the "puff loss." Current production systems generally just vent fuel fill vapors and puff losses to atmosphere, but more stringent air quality standards currently under debate may require that these, too, be controlled. Of the two other sources of vapor loss, fuel fill vapors are by far the largest in volume, so newly proposed vapor loss control systems are directed to controlling them at least. More far reaching proposed designs seek to control puff losses as well, however.

A common feature of the new systems proposed to recover fuel vapors is some sort of seal to block their exit to atmosphere. At the same time, a relatively free exit from the tank must be provided for fuel fill vapors to avoid pressure build up in the tank. Two basic sealing means show up frequently among the various proposed designs. Most common is a mechanical seal near the top of the filler pipe that tightly surrounds the nozzle as it is inserted to block the filler pipe. An exit port and vapor line through the filler pipe below the mechanical seal provide an exit path to the canister for the fuel fill vapors. Generally, some selective valve means is also provided to block the vapor exit path to the canister when the filler pipe is closed, and to open it only when the cap is removed or when the nozzle is inserted. A good example of such a mechanical seal system may be seen in U.S. Pat. No. 4,630,749 to Armstrong et al, assigned to the assignee of the subject invention. Less common is what has come to be known as a liquid seal system, which uses no mechanical seal to physically contact the nozzle. Instead, sealing is provided by the fuel from the dispensing nozzle. A liquid trap may be built into the filler pipe, or the force of the stream of fuel may itself be used to prevent the escape of vapors from the tank. Examples of several types of liquid seals may be seen in SAE Technical Paper #861551, published in Oct. of 1986.

The main advantage of a liquid seal system is that there is no rubbing seal around the nozzle to wear, a seal that may see rough use as different sized, worn, bent, and heavily leaned upon nozzles are inserted through it at varying angles. The lack of a convenient blocking seal around the nozzle is also a potential drawback, however. A path must still be provided for routing fuel fill vapors to the canister, and a mechanical nozzle seal can be used to help create that exit path. Likewise, the insertion of the nozzle through a seal can keep puff loss vapors from escaping the filler pipe until the nozzle triggers and opens a downstream port to a vapor vent line. Still, if a liquid seal system could be devised that would handle fuel vapors as well as a mechanical seal system does, it could prove very useful.

SUMMARY OF THE INVENTION

The invention provides a combined filler pipe and vapor control means for a liquid seal type of system in which the various components that make up the filler pipe cooperate to provide an exit path for fuel fill vapors and to control puff losses as well.

In the preferred embodiment, the filler pipe is made up of a first, smaller diameter pipe within a second, larger diameter pipe. Both pipes open at their lower ends into the fuel tank, while the upper end of the smaller pipe extends beyond the upper end of the larger pipe and terminates in an outwardly turned flange with one or more openings therethrough. The flange is radially spaced from the inside of the larger pipe by a predetermined amount. A short cylindrical sleeve has a wall thickness equal to the predetermined spacing so that it can be tightly inserted between the upper ends of the two pipes and clamped in place to maintain the pipes rigidly coaxial to one another. The annular space formed between the two pipes provides a convenient path out of the tank for the fuel fill vapors. Just above the flange, one or more ports open through the sleeve to a vapor vent line that runs to the canister. The sleeve is threaded to receive a cap and contains a skirt type seal that engages a conical lower portion of the cap both when the cap is in place and also as the cap is being threaded out.

A valve body in the form of a hollow stepped cylinder has a lower portion that slide fits within the upper end of the smaller pipe and an upper portion that slide fits within the sleeve. A seal mounted to the outside of the valve body has a lower face that is sized to cover the openings in the flange, and an outer lip that wipingly engages the inside of the sleeve. A ring at the top of the valve body has an outer diameter small enough the make contact with the lower end of the cap, but large enough to receive the fuel nozzle without contact. A spring biased between the lower end of the valve body and the smaller pipe biases the valve body continually upwardly.

When the cap is in place, it holds the valve body down far enough that the seal face covers the flange openings. There is thus no direct path between the annular space and the canister when the cap is in place, protecting against direct liquid fuel contamination. As the cap is threaded out and moves up, the skirt seal stays in contact with the cap for a while, as the valve body is concurrently moved up by the spring, axially guided both by the smaller pipe and the concentric sleeve. The seal face moves up away from the flange, uncovering the flange openings, while the seal lip stays in wiping contact with the inside of the sleeve, just above the sleeve ports to the vapor vent line. Thus, the only path out of the filler pipe available for any pressurized vapors in the filler pipe is to the canister. When the cap is fully removed and the nozzle inserted, the clearance between the nozzle and the ring at the top of the valve body prevents the valve from being pushed down, so the openings through the flange remain uncovered.

Thus, tank vapors displaced by the entering fuel may escape through the annular space between the pipes and through the vent line, and only through the vent line, to the canister.

It is, therefore, an object of the invention to provide a combined filler pipe and vapor control means with a high degree of mutual cooperation between the various components so as to achieve vapor loss control without the use of a mechanical seal around the nozzle.

It is another object of the invention to provide a such a structure in which an inner and outer pipe are maintained in rigid concentric relation by a sleeve tightly inserted between the outer pipe and an out turned flange at the upper end of the inner pipe, thereby providing a rigid composite filler pipe with a convenient path out of the fuel tank for fuel fill vapors, and in which a stepped cylindrical valve body rides up and down within the upper end of the inner pipe and the sleeve so that a seal on the outside of the valve body can cover and uncover openings in the flange to block and open a vapor exit path to the canister.

It is another object of the invention to provide such a structure in which a seal lip on the valve body wipes on the inside of the sleeve so that as the vapor exit path from the tank to the canister is opened, any escape path to the atmosphere is rigorously blocked.

BRIEF DESCRIPTION OF THE DRAWINGS

These and other objects and features of the invention will appear from the following written description, and from the drawings, in which:

FIGS. 2 through 4 show various stages in the assembly of the component parts;

FIG. 5 shows the completed preferred embodiment of the invention with a gas cap in place with a fuel tank and a vapor storage canister schematically;

DESCRIPTION OF THE PREFERRED EMBODIMENT

Figure 7:
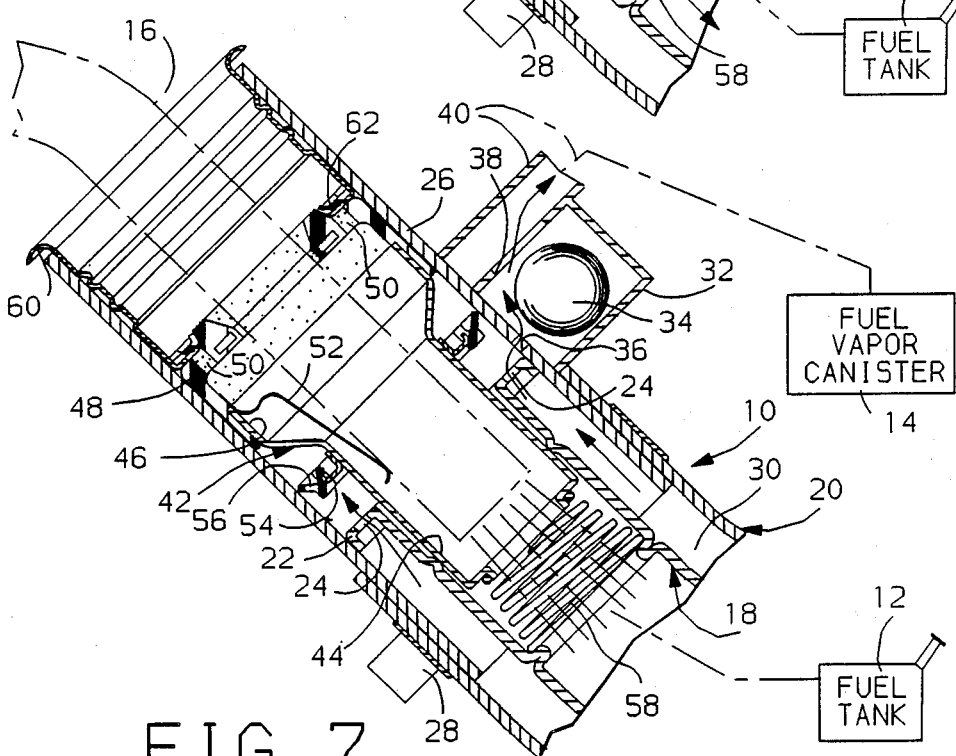
FIG. 7 shows the gas cap completely removed and the fuel nozzle inserted.

Referring first to FIG. 7, a preferred embodiment of the invention, designated generally at 10 is used in conjunction with a fuel tank 12. The fuel vapor loss control system for tank 12 includes a fuel vapor storage canister 14 to receive fuel fill vapors displaced from tank 12 when a stream of fuel leaves a fuel nozzle 16 and enters tank 12. A liquid seal system is used, that is, it is the force of the stream of liquid fuel from nozzle 16 entering tank 12 that prevents fuel fill vapors from exiting tank 12 directly back up and past the nozzle 16 to atmosphere. Since the fuel fill vapors must somehow leave tank 12 to prevent pressure build up in tank 12, some kind of vapor control means, generally a vapor vent valve, is generally provided. The vapor vent valve typically routes the fuel fill vapors to canister 14. The invention 10 combines the vapor vent valve function with a filler pipe for tank 12, and also controls puff losses in such a way as to share components and provide a high degree of mutual cooperation in a compact assembly.

Figure 1:
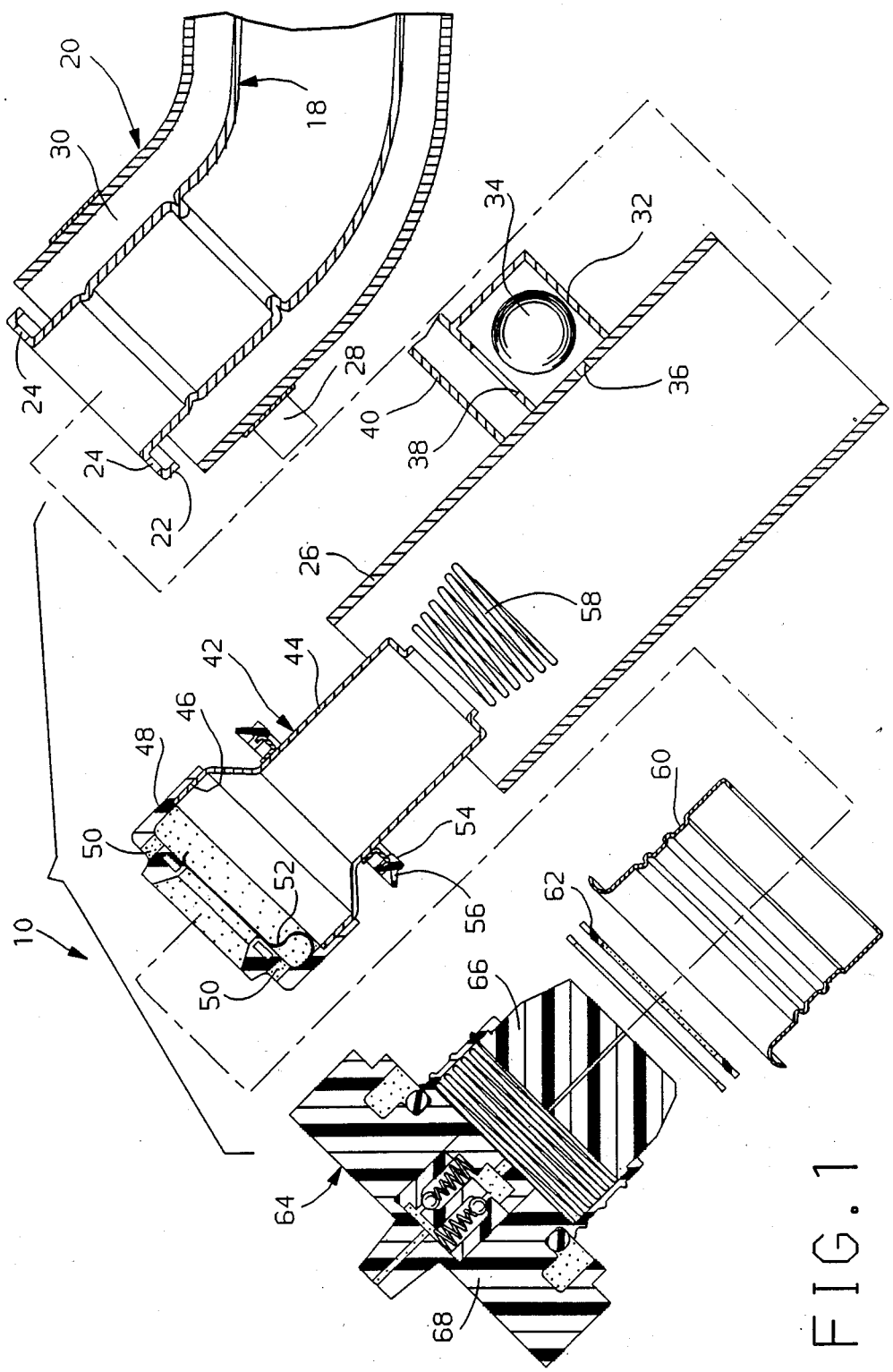
FIG. 1 is an exploded view showing the various component parts of a preferred embodiment of the invention.
Figure 2:
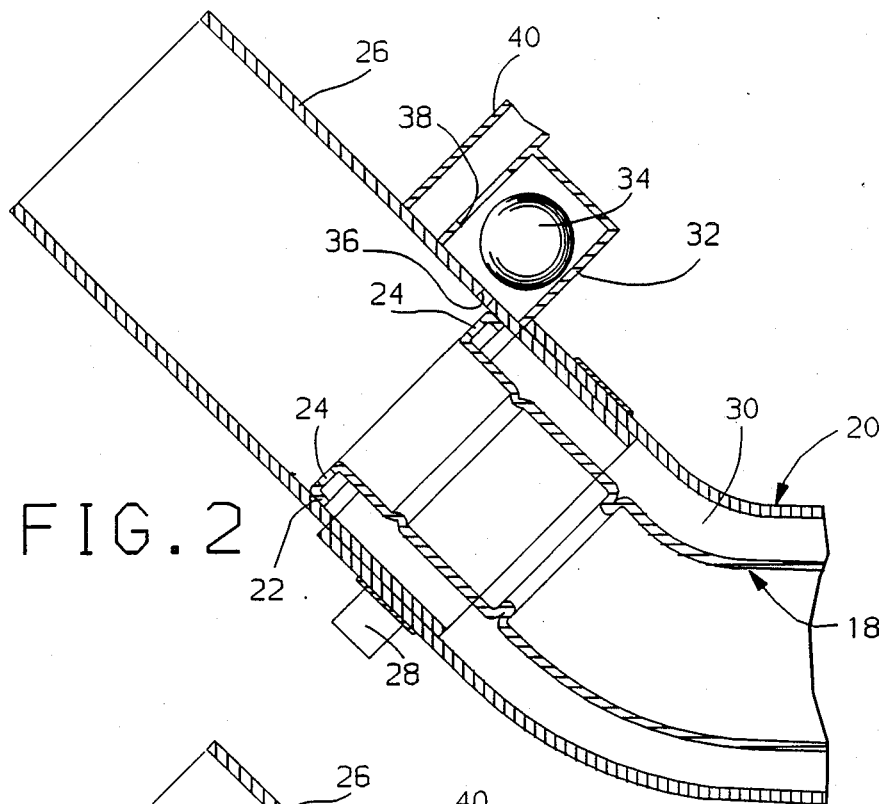

Referring next to FIGS. 1 and 2, the filler pipe portion of the combined assembly is provided in part by a generally cylindrical inner pipe 18 surrounded by larger diameter cylindrical outer pipe 20 which is generally concentric or coaxial thereto. Both pipes 18 and 20 open at their lower ends into tank 12, but the details of their juncture with tank 12 do not form part of the subject invention. The upper end of inner pipe 18 terminates proximate to the upper end of the outer pipe 20, just above it in the embodiment disclosed, comprising an out turned flange 22. Flange 22 has a series of openings or holes 24 cut through it, for a purpose described below. When the pipes 18 and 20 are held concentric to one another, the outer edge of flange 22 has a predetermined small radial spacing from the inner surface of outer pipe 20. The composite filler pipe also includes a short cylindrical sleeve 26, which has a wall thickness substantially equal to the radial spacing between flange 22 and outer pipe 20. Sleeve 26 may thus be tightly inserted between the upper end of outer pipe 20 and the outer edge of flange 22, and held in place with a clamp 28 or other suitable fastener. Thus, the two pipes 18 and 20 are maintained rigidly concentric or coaxial to one another, forming an annular space 30 therebetween that opens at its lower end the interior of tank 12 and at its upper end to the flange holes 24. Sleeve 26 also has a vent valve chamber 32 welded to the outside thereof at the junction between the upper end of the outer pipe 20 and sleeve 26. Chamber 32 is sized so as to fairly closely confine a buoyant ball valve 34 with some clearance from the top wall thereof. A port or ports 36 open through sleeve 26 just above flange 22 into chamber 32, and a port 38 smaller than the diameter of ball valve 34 opens through the top wall of chamber 32 so as to communicate chamber 32 with a vapor vent line 40 that runs to canister 14.

Referring next to FIG. 1, a stepped cylindrical valve body 42 has a metal shell with a lower portion 44 that fits closely within the upper end of inner pipe 18, and which merges across a conical transition section into an upper portion 46. A hard plastic ring 48 is molded to and over the upper shell portion 46 to create a smooth outer surface that fits closely within the upper end of outer pipe 20. Ring 48 has a flat upper surface and an inner diameter greater than the diameter of nozzle 16. A series of overfill relief ports 50 open through ring 48 into the interior of valve body 42. A spring steel flapper door 52 is secured to the interior of valve body 42, resting tightly against the underside of ring 48. Finally, a rubber or elastomer seal having a flat, annular lower face 54 and an outer lip 56 is secured to the outside of valve body lower portion 44. Seal face 54 is sized so as to cover the flange 22, specifically the holes 24 therein. The free state diameter of seal outer lip 56 is just larger than the inner diameter of sleeve 26.

Figure 3:
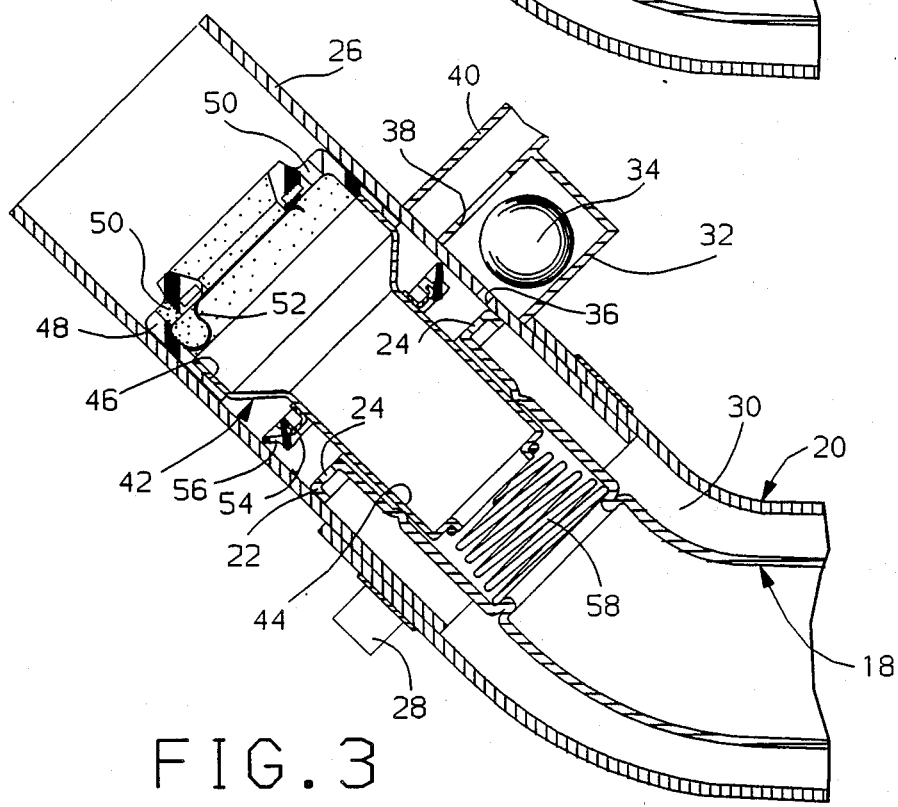

Referring next to FIGS. 1, 3 and 4, after sleeve 26 has been installed, a coil spring 58 is dropped into the upper end of inner pipe 18 and valve body 42 is then dropped in place so that its lower end rests on the top coil of spring 58. As valve body 42 slides up and down, its upper and lower portions 44 and 46 are rigorously axially guided by their sliding contact with the sleeve 26 and inner pipe 18 respectively. Concurrently, the seal outer lip 56 wipes along the inner surface of sleeve 26, creating an annular chamber just above flange 22 that is closed to atmosphere, but which opens to vapor vent line 40 through ports 36. If valve body 42 is pushed down as far as it can go, the seal lower face 54 contacts flange 22 and covers flange holes 24, but is continually biased up and away from flange 22 by the compressed spring 58. Finally, a threaded insert 60 is fixed inside the upper end of sleeve 26. Insert 60 has a skirt seal 62 extending radially inwardly and axially downwardly from the lower edge thereof. Insert 60 extends far enough down within sleeve 26 such that coil spring 58 pushes valve body 42 up far enough that the skirt seal 62 covers the overfill ports 50. A gas cap indicated generally at 64 has a two part construction with a lower portion 66 that is spring loaded and slidable within an upper portion 68. The lower edge of cap lower portion 66 is flat and approximately the same size as the upper surface of ring 48.

Referring next to FIG. 5, when cap 64 is in place, it holds valve body 42 down, compressing spring 58 so that seal lower face 54 covers flange holes 24, separating the annular space 30 from the vapor vent line 40. The spring loaded cap lower portion 66 can shift up a bit to compensate for cap 64 being over tightened, or to compensate for tolerance variations in the location of insert 60 within sleeve 26. Seal outer lip 56 wipes on the inner surface of sleeve 26, just above the ports 36. The skirt seal 62 makes sealing contact with the conical surface of cap lower portion 66 and, because of its orientation, any vapor or air pressure within sleeve 26 will force it into stronger sealing contact. Therefore, there is no escape path to atmosphere for any pressurized fuel vapors within either space 30 or sleeve 26.

Figure 6:
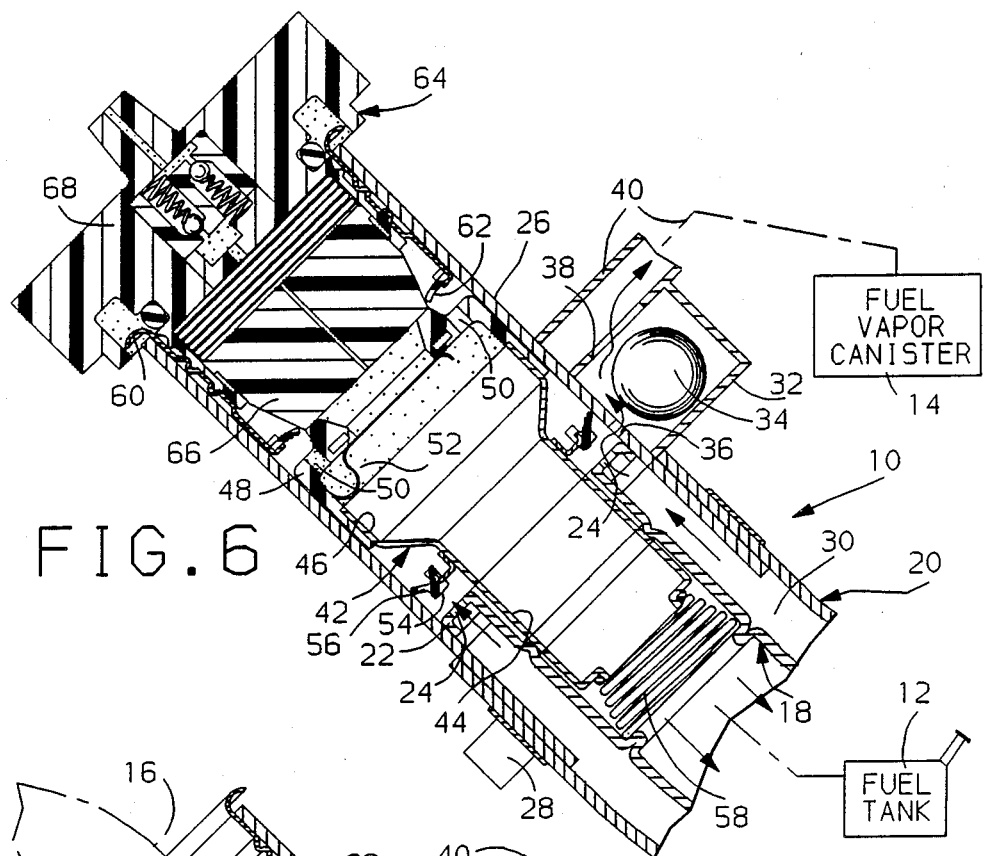
FIG. 6 shows the gas cap partially removed.

Referring next to FIG. 6, when cap 64 begins to be threaded out, spring 58 moves the valve body 42 up, which is guided axially by the sliding of its upper and lower portions 44 and 46 within the sleeve 26 and inner pipe 18 respectively. Concurrently, the seal lower face 54 moves up and away from the flange 22, uncovering the flange holes 24, while the seal outer lip 56 wipes up along the inner surface of sleeve 26. Because of its orientation and the pressure of fuel vapors within the sleeve 26, the skirt seal 62 stays in sealing contact with the cap lower portion 66. Therefore, any pressurized fuel vapors within either the sleeve 26 or the annular space 30 are blocked from reaching atmosphere. However, a path to chamber 32 is now open, and vapors may exit through ports 36 to vapor vent line 40 and ultimately to canister 14, as shown by the arrows. This vapor exit path is direct in the case of pressurized vapors within space 30, while those within the sleeve 26 and inner pipe 18 would have a less direct path out, going down inner pipe 18, through tank 12 and then up and out through space 30, by a process of pressure equalization between the inner pipe 18 and the space 30. At any rate, once cap 64 has been completely threaded out, the majority of puff loss vapors will have safely exited to canister 14, rather than to atmosphere.

Referring next to FIG. 7, with cap 64 removed, valve body 42 has moved up as far as it can, that is, until the skirt seal 62 covers the overfill ports 50. When nozzle 16 is inserted, displacing the flapper door 52, it will go through ring 48 with clearance. Valve body 42 will not move, so flange holes 24 remain uncovered and seal outer lip 56 stays in contact with the inner surface of sleeve 26, above the ports 36. When fuel begins to enter tank 12 through the inner pipe 18, the vapors displaced from tank 12 by the entering fuel have a convenient exit path out, through space 30, flange holes 24, ports 36, chamber 32, port 38, vapor vent line 40 and finally to canister 14, as shown by the arrows. Seal lip 56 blocks the displaced vapors from reaching atmosphere. Should liquid fuel for any reason rise up through space 30 as far as ports 36, ball valve 34 will float up against port 38, preventing liquid fuel from reaching vapor vent line 40.

Should liquid fuel overfill inner pipe 18 so far as to fill valve body 42 and reach the ports 50, the clearance between nozzle 16 and ring 48 may not be enough to allow the liquid overfill to exit quickly enough. In that case, skirt seal 62 can lift up to allow the overfill to exit the ports 50. Little, if any exiting overfill should flow down the interface between valve body upper portion 46 and the inner surface of sleeve 26 to reach the upper side of seal lip 56.

So, despite the lack of a mechanical seal surrounding nozzle 16, both puff losses vapors and fill losses are effectively controlled. This is done in a compact and relatively simple structure, with a high degree of cooperation and interaction between the various components. The inner and outer pipes 18 and 20 are kept rigid and concentric to one another as the sleeve 26 is tightly received between the flange 22 and the outer pipe 20, providing a convenient vapor exit path from tank 12. At the same time, flange 22 also provides a seat for a seal lower face 54 to block and unblock the connection between space 30 and chamber 32 provided by flange holes 24. Sleeve 26 retains cap 64, and cooperates with inner pipe 18 to guide valve body 42 as it slides up and down, assuring that its seals are accurately located. Valve body 42 mounts the flapper door 52 and carries seal outer lip 56 along the inside of sleeve 26 as it moves to help complete the vapor exit path to vent line 40. Any wear that seal outer lip 56 would experience would be much less than that seen by a nozzle seal. Variations of the preferred embodiment would be possible. For example, should the outside of valve body upper portion 46 conform to the inner surface of sleeve 26 closely enough, then the seal outer lip 56 could be eliminated. Therefore, it will be understood that the invention is not intended to be limited to just the embodiment disclosed.

The embodiments of the invention in which an exclusive property or privilege is claimed are defined as follows:

1. In a vehicle fuel vapor loss control system of the type that uses a stream of liquid fuel that exits a fuel nozzle during fuel fill to prevent fuel fill vapor displaced from said tank from exiting past said nozzle to atmosphere, a combined filler pipe and vapor control means for routing said fuel fill vapors to a storage canister and for also preventing pressurized fuel vapors that form in said tank when said filler pipe is closed by a cap from exiting to atmosphere when said cap is removed, said combined filler pipe and vapor control means comprising, a first generally cylindrical pipe sized to receive said nozzle at an upper end and opening at a lower end into said tank so as to admit fuel thereto, said first pipe further including a radially outwardly extending flange at said upper end with at least one opening therethrough, a second generally cylindrical pipe of larger diameter opening at a lower end to said tank and surrounding said first pipe so as to form an annular space therewith, said second pipe upper end being located proximate to said first pipe upper end and having a predetermined radial spacing from said flange, a generally cylindrical sleeve having a wall thickness substantially equal to said predetermined radial spacing so that the lower end thereof may be tightly inserted between said second pipe and said flange to maintain said first and second pipe upper ends rigidly coaxial to one another, said sleeve further including means at the upper end thereof to receive said cap and seal said sleeve from atmosphere until said cap is completely removed, a hollow valve body in the form of a stepped cylinder having a lower portion that fits slidably within said first pipe upper end and an upper portion that fits slidably within said sleeve upper end, resilient means biasing said valve body upwardly, a seal mounted to the outside of said valve body and having a lower face sized so as to cover said flange opening, a ring at the top of said valve body through which nozzle is receivable with radial clearance and which is engageable with said cap when said cap is in place to hold said valve body down with said seal face covering said flange opening, and, a vent line opening through said sleeve just above said flange and running to said storage canister, whereby, when said cap is in place, said annular space and said vent line are separated by said seal face covering said flange opening, and as said cap begins to be removed from said sleeve, said sleeve upper end remains blocked to atmosphere by said cap as said valve body begins to slide up under the force of said resilient means, guided by said first pipe and said sleeve, to uncover said flange opening so that any pressurized fuel vapors in either said first pipe or said annular space may exit only through said vent line, and after said cap is removed and said nozzle is inserted through said ring and into said first pipe upper end and fuel is dispensed, said valve body remains up and fuel vapors displaced from said tank will be displaced up said annular space and out through said vent line only.

2. In a vehicle fuel vapor loss control system of the type that uses a stream of liquid fuel that exits a fuel nozzle during fuel fill to prevent fuel fill vapors displaced from said tank from exiting past said nozzle to atmosphere, a combined filler pipe and vapor control means for routing said fuel fill vapors to a storage canister and for also preventing pressurized fuel vapors that form in said tank when said filler pipe is closed by a cap from exiting to atmosphere when said cap is removed, said combined filler pipe and vapor control means comprising, a first generally cylindrical pipe sized to receive said nozzle at an upper end and opening at a lower end into said tank so as to admit fuel thereto, said first pipe further including a radially outwardly extending flange at said upper end with at least one opening therethrough, a second generally cylindrical pipe of larger diameter opening at a lower end to said tank and surrounding said first pipe so as to form an annular space therewith, said second pipe upper end being located proximate to said first pipe upper end and having a predetermined radial spacing from said flange, a generally cylindrical sleeve having a wall thickness substantially equal to said predetermined radial spacing so that the lower end thereof may be tightly inserted between said second pipe and said flange to maintain said first and second pipe upper ends rigidly coaxial to one another, said sleeve further including means at the upper end thereof to receive said cap and seal said sleeve from atmosphere until said cap is completely removed, a hollow valve body in the form of a stepped cylinder having a lower portion that fits slidably within said first pipe upper and an upper portion that fits slidably within said sleeve upper end, resilient means biasing said valve body upwardly, a seal mounted to the outside of said valve body and having an outer lip wipingly engaged with the inside of said sleeve and a lower face sized so as to cover said flange opening, a ring at the top of said valve body through which said nozzle is receivable with radial clearance and which is engageable with said cap when said cap is in place to hold said valve body down with said seal face covering said flange opening, and, a vent line opening through said sleeve just above said flange and running to said storage canister, whereby, when said cap is in place, said annular space and said vent line are separated by said seal face covering said flange opening, and as said cap begins to be removed from said sleeve, said sleeve upper end remains blocked to atmosphere by said cap as said valve body begins to slide up under the force of said resilient means, guided by said first pipe and said sleeve, to uncover said flange opening so that any pressurized fuel vapors in either said first pipe or said annular space may exit only through said vent line, and after said cap is removed, said seal lip remains engaged with said sleeve inner surface so that when said nozzle is inserted through said ring and into said first pipe upper end and fuel is dispensed, said valve body remains up and fuel vapors displaced from said tank will be displaced up said annular space only and out said vent line.

* * * * *